(12) United States Patent
Pizzuto

(10) Patent No.: US 7,380,576 B2
(45) Date of Patent: Jun. 3, 2008

(54) MILLING TOOTH AND MILLING TOOTH HOLDER FOR A COMMINUTION MACHINE

(75) Inventor: Gian-franco Pizzuto, Fondo (IT)

(73) Assignee: FAE Italia S.R.L., Fondo (IT)

( * ) Notice: Subject to any disclaimer, the term of this patent is extended or adjusted under 35 U.S.C. 154(b) by 307 days.

(21) Appl. No.: 10/491,587

(22) PCT Filed: Oct. 7, 2002

(86) PCT No.: PCT/EP02/11227

§ 371 (c)(1),
(2), (4) Date: Aug. 25, 2004

(87) PCT Pub. No.: WO03/031069

PCT Pub. Date: Apr. 17, 2003

(65) Prior Publication Data

US 2005/0001084 A1    Jan. 6, 2005

(30) Foreign Application Priority Data

Oct. 5, 2001    (DE)    ............... 201 16 344 U

(51) Int. Cl.
*B27C 1/14* (2006.01)
(52) U.S. Cl. .................. 144/241; 407/46; 241/294
(58) Field of Classification Search ............ 407/46–48; 299/102, 103, 112 R; 144/218, 241, 24.12; 241/294

See application file for complete search history.

(56) References Cited

U.S. PATENT DOCUMENTS

| | | | |
|---|---|---|---|
| 3,732,023 A | | 5/1973 | Rank et al. |
| 3,750,758 A | | 8/1973 | Bancel |
| 3,844,619 A | * | 10/1974 | Haller .................. 299/108 |
| 4,667,713 A | * | 5/1987 | Wright .................. 144/231 |
| 4,750,396 A | * | 6/1988 | Gaddis et al. ............ 83/844 |
| 5,005,622 A | * | 4/1991 | Beach et al. ............ 144/241 |
| 5,183,089 A | * | 2/1993 | Norlander et al. ...... 144/231 |
| 5,413,286 A | | 5/1995 | Bateman |

FOREIGN PATENT DOCUMENTS

| | | |
|---|---|---|
| DE | 31 01 216 | 9/1982 |
| DE | 36 31 216 | 3/1988 |
| DE | 297 20 261 | 1/1998 |
| DE | 200 21 216 | 12/2000 |
| EP | 0 348 510 | 1/1990 |

* cited by examiner

*Primary Examiner*—Shelley Self
(74) *Attorney, Agent, or Firm*—Lowe Hauptman Ham & Berner LLP

(57) ABSTRACT

A milling tooth body for a comminution machine has a working side, oriented in a working direction; a flange side detachably connected to a milling tooth holder of the comminution machine; a tooth tip on the side of a recess; and a base at an end of the tooth body facing away from the tooth tip. A cutter device is in the recess. The flange side on the tooth body is opposite the working side. An entire side of the tooth body, which is oriented in the working direction, is the working side. The tooth tip projects away from the flange side in the direction of a longitudinal axis of the tooth body, perpendicular to the working direction. A first section of the tooth body projects away from the flange side in a direction parallel to and opposite the working direction.

19 Claims, 3 Drawing Sheets

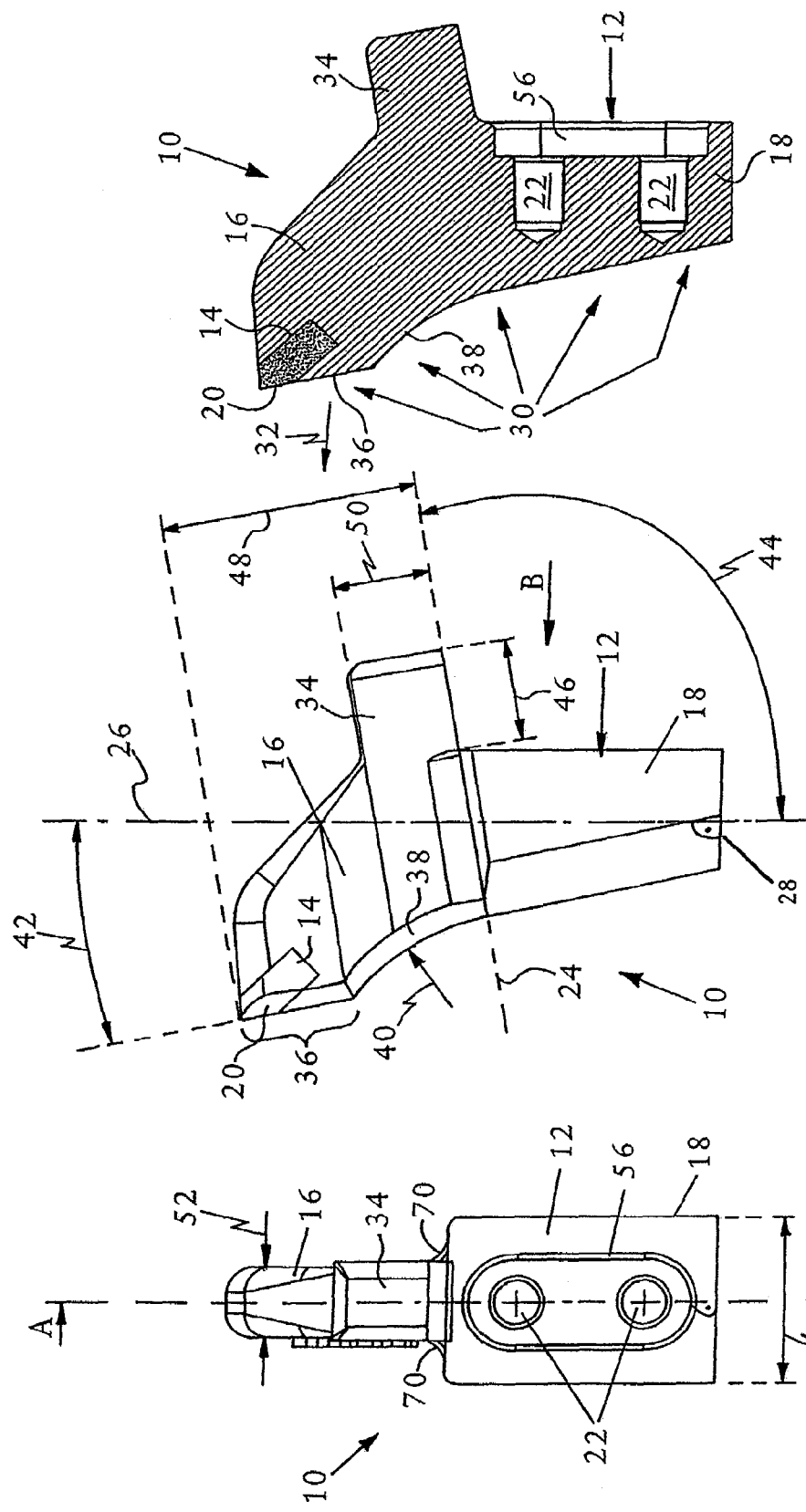

MILLING TOOTH AND MILLING TOOTH HOLDER FOR A COMMINUTION MACHINE

RELATED APPLICATIONS

The present application is based on, and claims priority from, Germany Application Number DE 201 16 344.6, filed Oct. 5, 2001 and International Application Number PCT/EP02/11227, filed Oct. 7, 2002, the disclosures of which are hereby incorporated by reference herein in their entirety.

FIELD OF THE INVENTION

The present invention relates to a milling tooth for a comminution machine, a milling tooth holder for a comminution machine and a comminution machine having a milling tooth holder.

BACKGROUND OF THE INVENTION

Milling teeth in the form of brush cutter flails or the like for earth working machines, such as mowers, choppers or mulchers, are disclosed by U.S. Pat. No. 3,678,671, DE 199 51 086 or EP 0 182 122, for example. These milling teeth are generally mounted in a sprung manner on a rotating drum, so that sudden mechanical effects or shocks on account of stones or the like do not lead to immediate destruction of the milling teeth involved. However, the desired action is limited, particularly in the case of hard materials such as wood, because of the spring mounting.

SUMMARY OF THE INVENTION

The invention is based on the object of improving a milling tooth, a milling tooth holder and a comminution machine of the abovementioned type with respect to the relationship between costs and service life, that is to say with respect to economy.

One aspect of the invention relates to a milling tooth of the abovementioned spring type, wherein the flange side is on the milling tooth body opposite the working side. An entire side of the milling tooth body which is oriented in the working direction is as the working side. The milling tooth tip projects beyond the flange side in the direction of a longitudinal axis of the milling tooth body, perpendicular to the working direction. A first section of the milling tooth body projects beyond the flange side in a direction parallel and opposite to the working direction.

In a milling tooth holder of the abovementioned type, the invention provides for said holder to have a flange side pointing in the working direction for fixing the milling tooth with an elevation and, adjacent to the flange side, to have a flat section in such a way that the first section of the milling tooth is supported on this flat section.

The foregoing construction has the advantage that, in a surprising way, a particularly long service life of the milling tooth is achieved. Because the section projects beyond the flange side in a direction parallel and opposite to the working direction, the milling tooth is supported on the milling tooth holder. At the same time, particularly high shear forces in the region underneath the projecting section are avoided, since the entire milling tooth body on the working side is acted on by forces and not merely the region of the projecting milling tooth tip above the milling tooth base. Because of the arrangement and formation of the flange side of the milling tooth and milling tooth holder, (1) particularly good and uniform dissipation of forces from the milling tooth to the milling tooth holder is achieved, and (2) pressure peaks in the milling tooth body are avoided, particularly at the transition from the milling tooth base to the milling tooth tip.

The section projecting beyond the flange side in a direction parallel and opposite to the working direction is expediently a part of the milling tooth tip.

Greater strength and durability of the milling tooth are achieved by the milling tooth tip having a smaller width than the milling tooth base.

The greatest possible contact area between the milling tooth body and the milling tooth holder, with little lateral play, is achieved by an oval recess on the flange side for engaging an oval elevation on the milling tooth holder.

In a particularly preferred embodiment, starting from the cutting device in the direction of the milling tooth base, a predetermined second section of the working side of the milling tooth tip is straight and is tilted by a predetermined first angle, for example 10 degrees to 14 degrees, in particular 12 degrees, with respect to a longitudinal axis of the milling tooth body. On the working side of the milling tooth body, between the milling tooth base and the second section, a third section with a predetermined curvature is formed; the curvature for example, has a radius of curvature of 50 mm to 70 mm, in particular 60 mm. A dividing plane between the milling tooth base and milling tooth tip is tilted with respect to a longitudinal axis of the milling tooth body by a predetermined second angle of, for example, 90 degrees to 110 degrees, in particular 100 degrees. The first section projects beyond the flange side by 30 mm to 40 mm, in particular by 33.4 mm. The milling tooth tip projects beyond the flange side by 60 mm to 90 mm, in particular by 78 mm. The first section has a height of 20 mm to 40 mm, in particular of 29.5 mm. The milling tooth tip has a width of 15 mm to 30 mm, in particular of 23 mm. The milling tooth base has a width of 50 mm to 60 mm, in particular of 55 mm.

The invention will be described in more detail below using the drawing.

BRIEF DESCRIPTION OF THE DRAWING

FIG. 1 is a side view of a milling tooth according to a preferred embodiment,

FIG. 2 is a front view of the milling tooth of FIG. 1 in the direction of arrow B of FIG. 1, FIG. 3 is a sectional view of the milling tooth of FIG. 1, along the line A-A of FIG. 2.

DETAILED DESCRIPTION OF THE DRAWING

Figure 6:
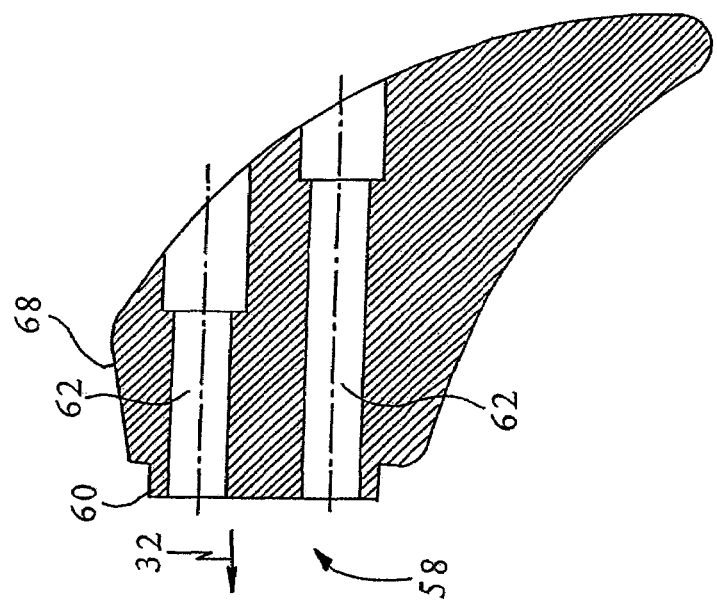
FIG. 6 is a sectional view, along the line D-D of FIG. 5 of the milling tooth holder according to FIG. 4.

The preferred embodiment, shown in FIGS. 1 to 3, of a milling tooth 10 for a comminution machine, not shown in its entirety, comprises a milling tooth body with a flange side 12 for detachable connection to a milling tooth holder of the comminution machine, a recess 14, a milling tooth tip 16 on the side of the recess 14 and a milling tooth base 18 on the end of the milling tooth body facing away from the milling tooth tip 16. Arranged in the recess 14 is a cutting device 20 in the form of two hard metal parts. These hard metal parts are, for example, soldered into the recess 14. Accessible from the flange side 12, in the milling tooth body, are two threaded holes 22, by means of which a braced fastening to the milling tooth holder is carried out. For this purpose, in each case a screw reaches through the milling tooth holder into the threaded hole 22, as will be described later in detail in relation to FIG. 7.

The milling tooth tip 16 is separated from the milling tooth base 18 by a dividing plane 24. Milling tooth body has a longitudinal axis 26 that is perpendicular to bottom face 28 of the milling tooth base 18. The milling tooth tip 16 is narrower than the milling tooth base 18 (cf. FIG. 2). The milling tooth body has a working side 30, which is oriented in a working direction 32. The flange side 12 is formed on the milling tooth body opposite the working side 30. The entire working side 30 of the milling tooth body which points in the working direction is designed as the working side. The milling tooth tip 16 projects beyond the flange side 12, starting from the dividing plane 24, in the direction of the longitudinal axis 26, which is oriented perpendicular to the working direction 32. A first section 34 of the milling tooth body projects beyond the flange side 12 in the direction opposite to the working direction 32. On the working side 30, starting from the cutting device 20, there is formed a flat, that is linear or straight, second section 36, which is followed by a curved third section 38 with a predetermined radius of curvature 40; section 38 extends between the dividing plane 24 and flat section 36.

In the embodiment illustrated, the second section 36 of the working side 30 of the milling tooth tip 26 is tilted by a predetermined first angle 42 of 12 degrees with respect to the longitudinal axis 26 of the milling tooth body. The third section 38 has a radius of curvature of 60 mm. The dividing plane 24 between milling tooth base 18 and milling tooth tip 16 is tilted with respect to the longitudinal axis 26 by a predetermined second angle 44 of 100 degrees. The first section 34 projects beyond the flange side 12 by a length 46 of 33.4 mm. The milling tooth tip 16 projects beyond the flange side 12 by a length 48 of 78 mm. The first section 34 has a height 50 of 29.5 mm. The milling tooth tip 16 has a width 52 of 23 mm. The milling tooth base 18 has a width 54 of 55 mm.

As a result of the illustrated configuration of the milling tooth 10, shear forces are avoided in the milling tooth body in the transition region from milling tooth tip 16 to milling tooth base 18, that is, in the region of the dividing plane 24. Instead, the milling tooth 10 is supported with the first section 34 on the milling tooth holder. At the same time, an end face of the milling tooth base 18, pointing in the working direction 32, is also formed as part of the working surface 30 of the milling tooth body, so that mechanical loading of the milling tooth 10 acts on the entire surface 30 and thus on the entire milling tooth body and not just on the milling tooth tip 16. At the same time, the milling tooth holder is covered completely in the working direction 32 by the milling tooth 10, so that the milling tooth holder is protected against the direct mechanical action of force or loading.

In addition, on the flange side 12, in the region of the threaded holes 22, the milling tooth 10 has an oval recess 56, which additionally interacts in a stabilizing manner with flange side of the milling tooth holder, as described in more detail below.

Figure 5:
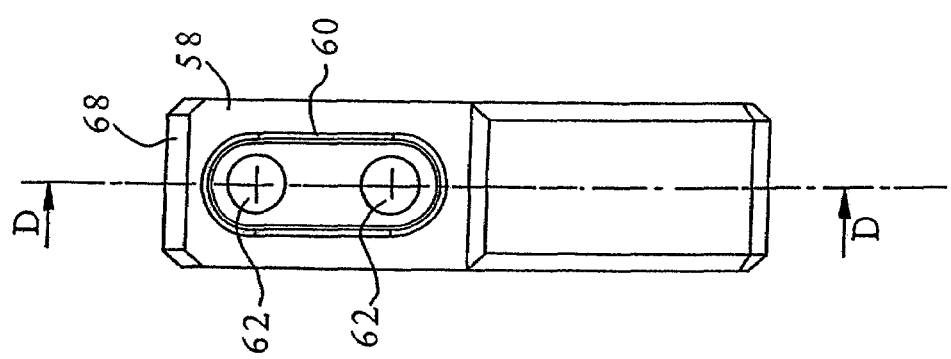
FIG. 5 is a front view in the direction of arrow C of FIG. 4 of the milling tooth holder of FIG. 4.
Figure 4:
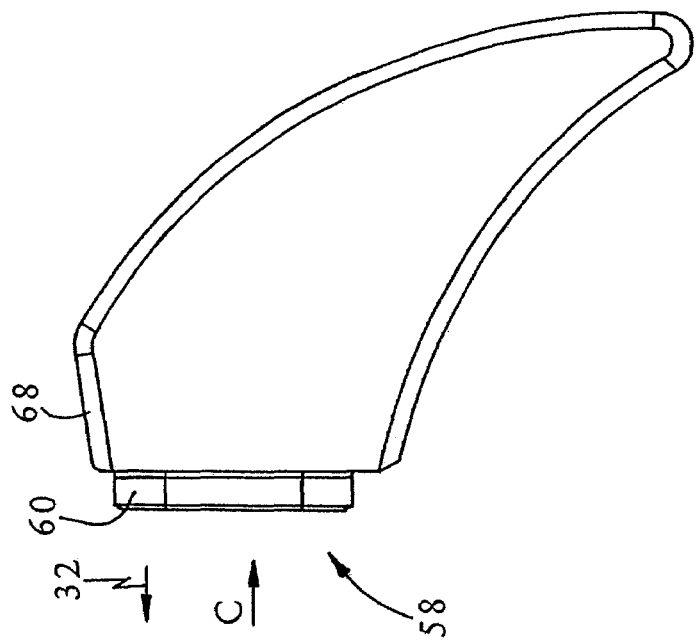
FIG. 4 is a side view of a milling tooth holder for the milling tooth of FIGS. 1 to 3.

FIGS. 4 to 6 are illustrations of a preferred embodiment of a milling tooth holder that matches the above described milling tooth 10. The tooth holder has a flange side 58 with an oval elevation 60 corresponding to the oval recess 56 in the flange side 12 of the milling tooth 10. The milling tooth holder has two through holes 62 which are aligned with the threaded holes 22 in the milling tooth 10.

Figure 7:
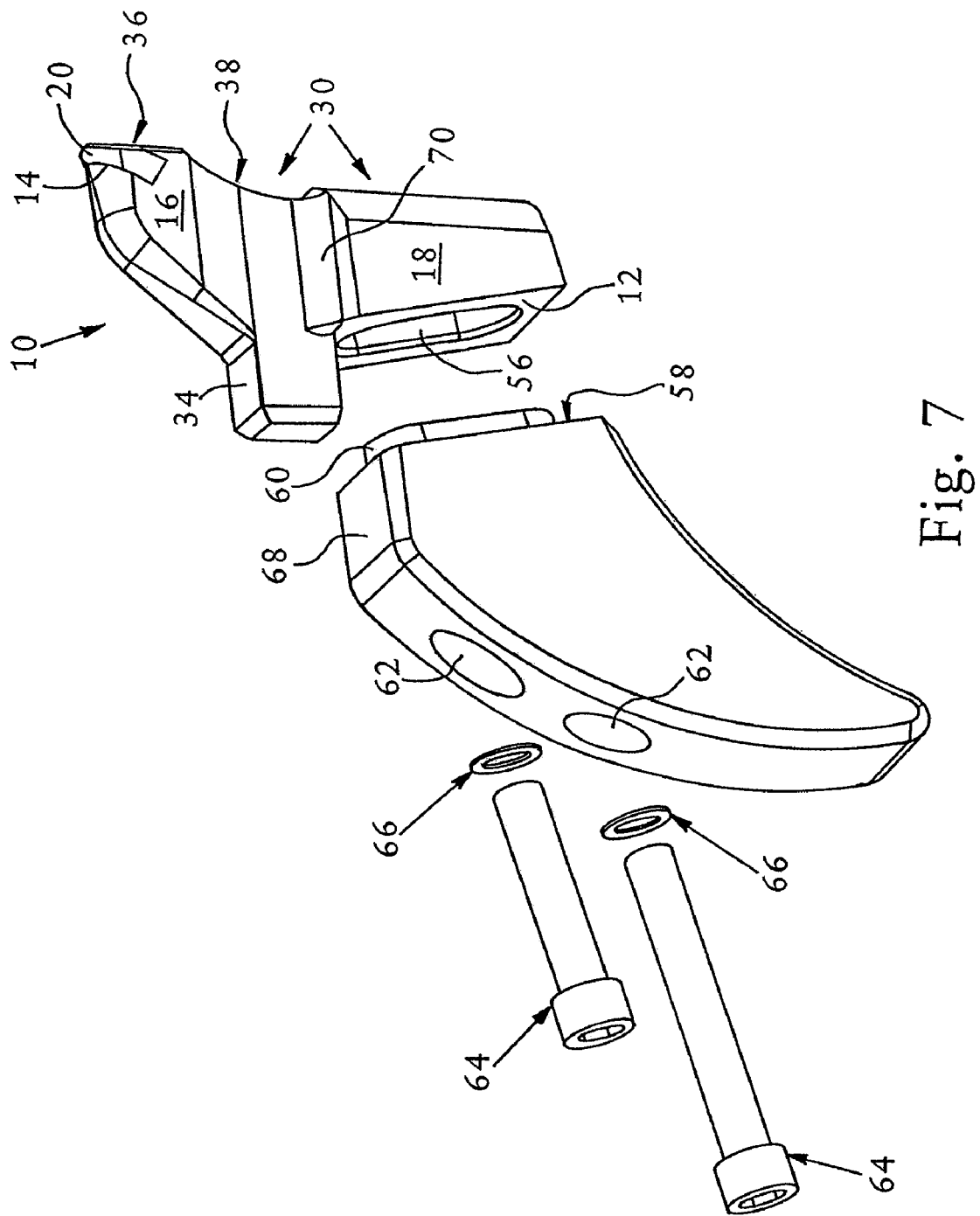
FIG. 7 is a perspective, exploded view of the milling tooth of FIG. 1 with the milling tooth holder of FIG. 4.

FIG. 7 is an exploded illustration of an assembly of the milling tooth holder of FIGS. 4-6 and milling tooth 10. The milling tooth 10 is plugged onto the milling tooth holder, so that the respective flange sides 12 and 58 abut and the elevation 60 of the milling tooth holder engages in the recess 56 in the milling tooth 10. Screws 64 with washers 66 are plugged through the holes 62 and screwed into the threaded holes 22 (see FIGS. 2, 3) in the milling tooth 10. The first section 34 beers on a flat section 68 of the milling tooth holder, so that the milling tooth 10 is supported on the milling tooth holder.

As can be seen in particular from FIGS. 2 and 7, in the region of the transition between milling tooth tip 16 and milling tooth base 18, reinforcement 70 is fixed, for example by a welded seam or an additional fixed molding. This provides additional mechanical stability in the region of the dividing plane 24 (see FIG. 1) between milling tooth tip 16 and milling tooth base 18.

The invention claimed is:

1. A milling tooth for a comminution machine, the milling tooth having a milling tooth body comprising a working side oriented in a working direction, a flange side for detachable connection to a milling tooth holder of the comminution machine, the working side including a recess, a milling tooth tip on the side of the recess and the working side of the body, a milling tooth base at an end of the body facing away from the milling tooth tip, a cutting device in the recess, the flange side being formed on the milling tooth body opposite the working side, an entire side of the milling tooth body that is oriented in the working direction being the working side, the milling tooth tip projecting beyond the flange side in the direction of a longitudinal axis of the milling tooth body and perpendicular to the working direction, a first section of the milling tooth body projecting beyond the flange side in a direction parallel and opposite to the working direction by a distance in the range of 30 mm to 40 mm.

2. The milling tooth as claimed in claim 1, wherein the first section projecting beyond the flange side, in a direction parallel and opposite to the working direction, is part of the milling tooth tip.

3. The milling tooth as claimed in claim 1 wherein the milling tooth tip has a smaller width than the milling tooth base.

4. The milling tooth of claim 1 wherein the flange side includes an oval recess for engaging an oval elevation on the milling tooth holder.

5. The milling tooth of claim 1 wherein, starting from the cutting device in the direction of the milling tooth base, a predetermined second section of the working side of the milling tooth tip is straight and is tilted by a predetermined first angle, with respect to a longitudinal axis of the milling tooth body.

6. The milling tooth of claim 5, wherein the predetermined first angle is in the range of 10 degrees to 14 degrees.

7. The milling tooth of claim 5 wherein the working side of the milling tooth body, between the milling tooth base and the second section, has a third section with a predetermined curvature.

8. The milling tooth of claim 7, wherein the predetermined curvature of the third section has a radius of curvature in the range of 50 mm to 70 mm.

9. The milling tooth of claim 1, wherein a dividing plane between the milling tooth base and the milling tooth tip is tilted with respect to a longitudinal axis of the milling tooth body by a predetermined second angle.

10. The milling tooth of claim 9, wherein the predetermined second angle is in the range of 90 degrees to 110 degrees.

11. The milling tooth of claim 1 wherein the milling tooth tip projects beyond the flange side by a distance in the range of 60 mm to 90 mm.

12. The milling tooth of claim 1 wherein the first section has a height in the range of 20 mm to 40 mm.

13. The milling tooth of claim 1 wherein the milling tooth tip has a width in the range of 15 mm to 30 mm.

14. The milling tooth of claim 1 wherein the milling tooth base has a width in the range of 50 mm to 60 mm.

15. A milling tooth holder for a comminution machine, for holding a milling tooth, the milling tooth having a milling tooth body comprising a working side oriented in a working direction, a flange side for detachable connection to a milling tooth holder of the comminution machine, the working side including a recess, a milling tooth tip on the side of the recess and the working side of the body including the recess, a milling tooth base at an end of the body facing away from the milling tooth tip, a cutting device in the recess, the flange side being formed on the milling tooth body opposite the working side, an entire side of the milling tooth body that is oriented in the working direction being the working side, the milling tooth tip projecting beyond the flange side in the direction of a longitudinal axis of the milling tooth body and perpendicular to the working direction, a first section of the milling tooth body projecting beyond the flange side in a direction parallel and opposite to the working direction by a distance in the range of 30 mm to 40 mm, wherein the milling tooth holder has a flange side pointing in the working direction for fixing the milling tooth with an elevation and, adjacent to the flange side, has a flat section such that the first section of the milling tooth is supported on said flat section.

16. A comminution machine comprising a rotatable roller, on which at least one milling tooth holder for holding a milling tooth is fixed, the milling tooth having a milling tooth body comprising a working side oriented in a working direction, a flange side for detachable connection to a milling tooth holder of the comminution machine, the working side including a recess, a milling tooth tip on the side of the recess and on the working side of the body, a milling tooth base at an end of the body facing away from the milling tooth tip, a cutting device in the recess, the flange side being formed on the milling tooth body opposite the working side, an entire side of the milling tooth body that is oriented in the working direction being the working side, the milling tooth tip projecting beyond the flange side in the direction of a longitudinal axis of the milling tooth body and perpendicular to the working direction, a first section of the milling tooth body projecting beyond the flange side in a direction parallel and opposite to the working direction by a distance in the range of 30 mm to 40 mm, the milling tooth holder having a flange side pointing in the working direction for fixing the milling tooth with an elevation and, adjacent to the flange side of the milling tooth holder, has a flat section such that the first section of the milling tooth is supported on said flat section.

17. The milling tooth of claim 6 wherein the angle is 12 degrees.

18. The milling tooth of claim 8 wherein the radius of the curvature is 60 mm.

19. The milling tooth of claim 1 wherein the distance is 33.4 mm.

* * * * *